United States Patent [19]
Genovese

[11] Patent Number: 6,157,400
[45] Date of Patent: Dec. 5, 2000

[54] METHOD AND APPARATUS FOR CONTROLLING A PIXEL CLOCK IN A ROTATING POLYGON TYPE IMAGE FORMING APPARATUS

[75] Inventor: Frank C. Genovese, Fairport, N.Y.

[73] Assignee: Xerox Corporation, Stamford, Conn.

[21] Appl. No.: 09/211,966

[22] Filed: Dec. 15, 1998

[51] Int. Cl.[7] ................................................. B41J 2/435
[52] U.S. Cl. ........................ 347/250; 347/235; 455/313; 455/260
[58] Field of Search ................................. 347/235, 248, 347/249, 250; 331/1 A; 235/462.25; 455/180.3, 313, 260

[56] References Cited

U.S. PATENT DOCUMENTS

| | | | |
|---|---|---|---|
| 5,212,570 | 5/1993 | Nacman | 358/481 |
| 5,477,330 | 12/1995 | Dorr | 358/296 |
| 5,517,230 | 5/1996 | Lofthus et al. | 347/235 |
| 5,651,017 | 7/1997 | Genovese | 372/38 |
| 5,867,068 | 2/1999 | Keating | 331/1 A |
| 5,910,651 | 6/1999 | Ryvkin | 235/462.25 |

OTHER PUBLICATIONS

The Technique of Direct Programming by Using a Two-Modulus Prescaler, Motorola Semiconducor Technical Data, AN827/D, Motoral, Inc. 1995.

*Primary Examiner*—N. Le
*Assistant Examiner*—Hai C. Pham
*Attorney, Agent, or Firm*—John M Kelly

[57] ABSTRACT

An imaging system having a raster output scanner that produces high quality scan lines comprised of evenly spaced pixels. The raster output laser device is modulated in accordance with a variable frequency pixel clock that is derived from a high frequency oscillator using a dual modulus programmable divider that is controlled by a state machine. In turn, that state machine is controlled by information stored in a memory. The variable frequency pixel clock compensates for scan line nonlinearity, polygon facet errors, and/or scan line magnification.

16 Claims, 5 Drawing Sheets

METHOD AND APPARATUS FOR CONTROLLING A PIXEL CLOCK IN A ROTATING POLYGON TYPE IMAGE FORMING APPARATUS

FIELD OF THE INVENTION

This invention generally relates to imaging devices that use raster output scanners. More specifically, this invention relates to controlling the pixel positions along a scan line.

BACKGROUND OF THE PRESENT INVENTION

Electrophotographic marking is a well-known, commonly used method of copying or printing documents. Electrophotographic marking is performed by exposing a charged photoreceptor with a light image representation of a desired document. The photoreceptor is discharged in response to that light image, creating an electrostatic latent image of the desired document on the photoreceptor's surface. Toner particles are then deposited onto that latent image, forming a toner image, which is then transferred onto a substrate, such as a sheet of paper. The transferred toner image is then fused to the substrate, usually using heat and/or pressure, thereby creating a permanent record of the original representation. The surface of the photoreceptor is then cleaned of residual developing material and recharged in preparation for the production of other images.

One way of exposing the photoreceptor is to use a Raster Output Scanner (ROS). A ROS is typically comprised of a laser light source (or sources), a pre-polygon optical system, a rotating polygon having a plurality of mirrored facets, and a post-polygon optical system. In a simplified description of operation a collimated light beam is reflected from facets of an optical polygon and passes through imaging elements that project it into a finely focused spot of light on the photoreceptor surface. As the polygon rotates, the focused spot traces a path on the photoreceptor surface referred to as a scan line. By moving the photoreceptor as the polygon rotates the spot raster scans the surface of the photoreceptor. By modulating the laser beam with image information a predetermined latent image is produced on the photoreceptor. The plane of the sweeping beam is referred to herein as the tangential optical plane while the direction of motion of the photoreceptor is in the sagittal direction.

Figure 1:
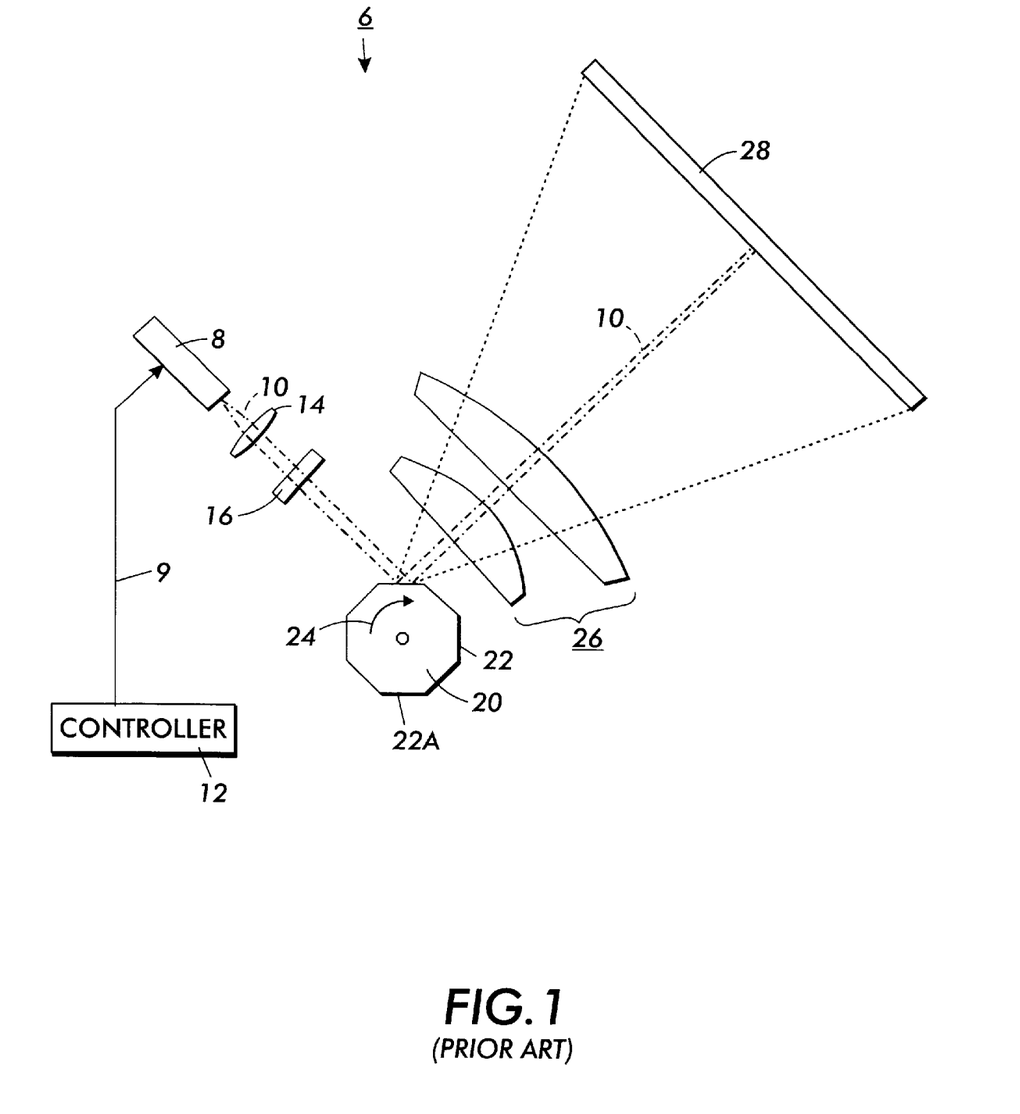
FIG. 1 is a schematic illustration of a prior art imaging system that uses image distortion in post-scan optical elements to produce scan lines of evenly spaced, uniformly sized pixels.

Referring now to FIG. 1, a typical prior art imaging system 6 includes a laser diode 8 that emits a laser beam 10 that is modulated in response to drive signals from a controller 12. When emitted from laser diode 8, the laser beam 10 is divergent. Lens 14 collimates that diverging beam and the collimated output is directed through cylindrical lens 16 that has focusing power only in the sagittal direction. Lens 16 is part of the optical architecture intended to minimize a ROS defect commonly referred to as polygon wobble. After passing through the cylindrical lens 16 the laser beam is incident on a polygon 20 that includes a plurality of mirrored facets 22. The polygon is rotated at a constant rotational velocity by a motor (not shown) in a direction 24. The mirrored facets deflect the laser beam as the polygon rotates, resulting in a sweeping laser beam. A post-scan optical system 26 focuses the laser beam 10 to form a spot of circular or elliptic cross sectional shape on the photoreceptor 28. Significantly, the post-scan optical system 26 is typically an F-theta lens design intended to correct for scan line nonlinearity (see below). In FIG. 1, the direction of photoreceptor motion would be into (or out of) the view plane.

By properly modulating the laser beam 10 as the focused spot sweeps across the photoreceptor a desired latent image is produced That latent image is comprised of multiple scan lines, each of which is comprised of a plurality of image elements referred to as pixels. Ideally, the imaging system 6 should produce a geometrically straight scan line having evenly spaced, identically sized pixels. However, obtaining ideal pixels is difficult. The basic geometry of the flat image pane associated with an ordinary photographic lens design, such as found in a landscape or copy lens, leads to significant scan length distortion when used with a beam deflected at constant angular velocity. In such a lens, one degree of polygon rotation produces different lengths of deflection at different points along the scan path. The sweep distance per degree of rotation is greater near the ends of the photoreceptor 10 than at the center. As a consequence, the spot velocity varies as the spot scans across the photoreceptor, being higher towards the ends of the scan line and lower towards the center of the scan line. A varying spot velocity makes it necessary to adjust the modulation rate of the light source in order to compensate for the changes in spot velocity along the scan path and produce scan lines having evenly spaced, constant length, pixels. The source intensity may also need to be matched to the local spot velocity along the scan path in order to provide uniform exposure for discharging the photoreceptor. Without corrections the pixels would be further apart at the edges of the photoreceptor and closer together towards the center.

Various methods have been used to produce high quality scan lines of evenly spaced, uniformly sized pixels. In the post polygon optics imaging system 6 the lens 26 is typically of an F-theta design, wherein carefully engineered optical distortions have been incorporated in the optical design to compensate for the scan non-linearity as well as for polygon wobble. These lenses are referred to as F-theta designs because the focused spot position along the scan path is proportional to the product of the effective focal length F times the input deflection angle theta (in radians). Good F-theta designs have residual errors of only a few pixels. The result is a spot velocity that is a significant improvement over an uncorrected system, being relatively constant along the entire scan line. Unfortunately, the optical system of FIG. 1 typically employs bulky and expensive lens elements and requires some compromises in spot definition, image flatness, and color correction in order to allow reasonable distortion compensation in the design.

It is also possible to produce evenly spaced, uniformly sized pixels by tailoring the pixel clock frequency. Typically, the modulation rate is controlled using a pixel clock. If the pixel clock's frequency is properly varied, i.e., if the frequency matches the spot velocity at every point along the scan path, it is possible to exactly compensate for the varying spot velocity. However, in some critical applications it is important that the light source intensity also be matched to the local spot velocity along the scan path in order to compensate for the differences in spot dwell time and provide uniform exposure along the scan path. Otherwise pixels at the center of the scan line, where the spot velocity is lowest (for example) would be exposed more than those at the ends of the scan line. The extra exposure results in a slightly larger discharged area which causes spot growth, a process that is referred to as "blooming" or exposure smile error.

Figure 2:
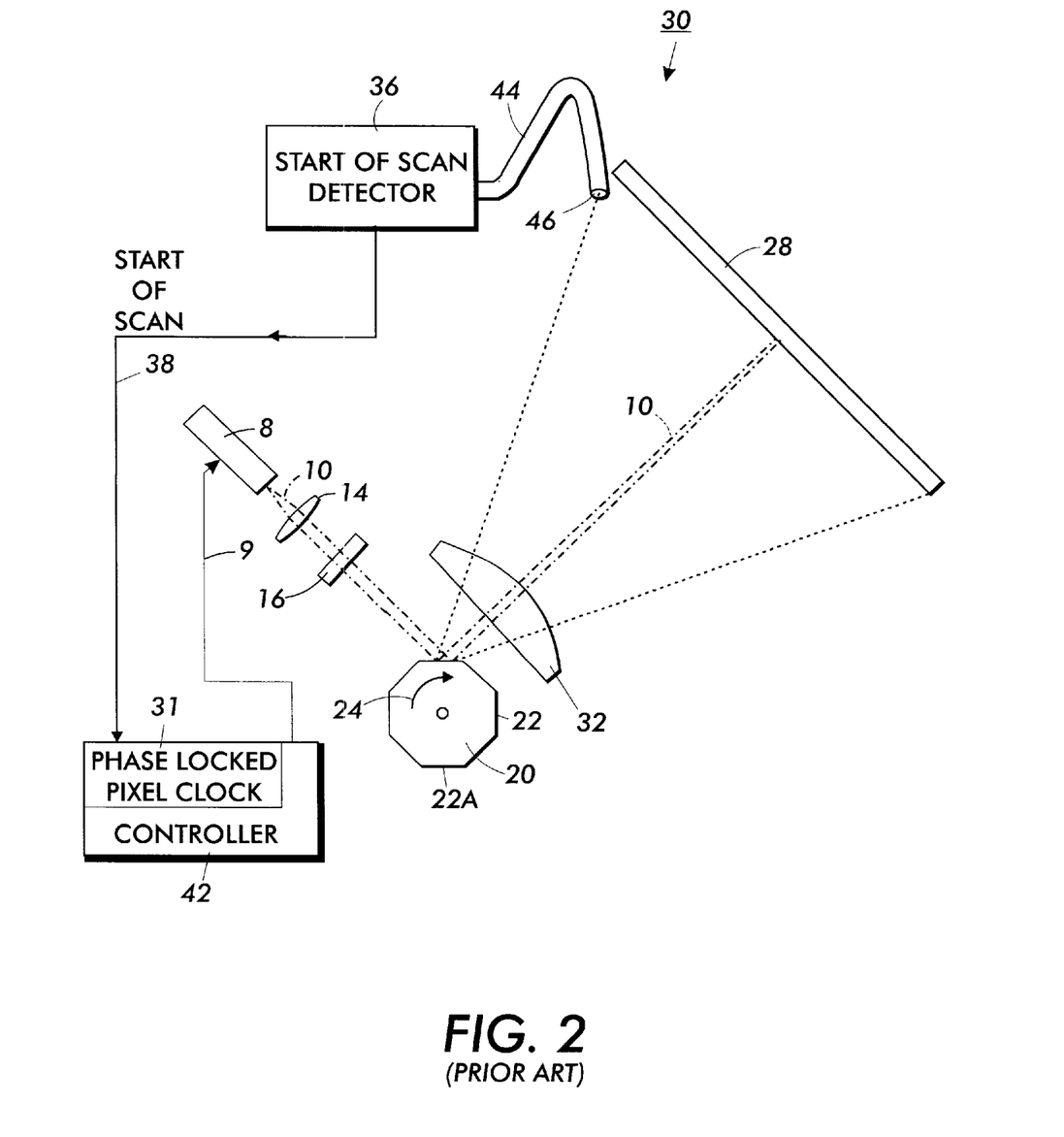
FIG. 2 is a schematic illustration of a prior art imaging system that uses a variable frequency pixel clock that is derived from a phase locked loop.

When variable frequency pixel clocks are used to produce scan lines having evenly spaced, uniformly sized pixels some means of synchronizing the pixel clock frequency with the spot position on the photoreceptor is required. FIG. 2 shows a prior art imaging system 30 that has an optical system very similar to that of the imaging system 6, except that the post polygon lens is not an F-Theta lens. The imaging system 30 includes a variable frequency pixel clock 31 and a start-of-scan detector 36. The variable frequency pixel clock produces a controlled frequency sweep that beings at a predetermined frequency upon the occurrence of a start-of-scan signal from the start-of-scan detector 36. The initial frequency and the frequency sweep profile are such that scan line pixels are properly spaced along the scan line. Start-of-scan detectors are well known. The one in the imaging system 30 incorporates a fiber-optic element 44 that guides light received at its input ends 46, which is in the tangential scan plane, to a photosensitive element (not shown). In response, the start-of-scan detector 36 produces the start of scan signal.

Prior art imaging systems have usually had variable frequency pixel clocks that are based upon phase locked loops (PLL). However, such systems have the disadvantages of complexity and expense. Furthermore, the phase locked loops that have been used employ analog feedback schemes that lack the noise immunity, stability and the reliability of a totally digital design. Therefore, a new technique of achieving a variable pixel clock frequency would be beneficial.

The following disclosures may relate to various aspects of the present invention.

U.S. Pat. No. 5,212,570

Patentee: Nacman

Issued: May 18, 1993

U.S. Pat. No. 5,477,330

Patentee: Dorr

Issued: Dec. 19, 1995

U.S. Pat. No. 5,517,230

Patentee: Lofthus et al.

Issued: May 14, 1996

The disclosures of the above-identified patents may be briefly summarized as follows:

U.S. Pat. No. 5,212,570, entitled, "PIXEL CLOCK PHASE LOCKED LOOP FOR A LASER SCANNER," discloses a pixel clock phase locked loop for a laser scanner. A rotating, multi-faceted polygon receives start-of-scan and end-of-scan pulses for each of a plurality of scan lines. A voltage-controlled oscillator generates a desired output frequency of the pixel clock. A desired number of pixels in each scan line are counted, and a pulse is generated at the last pixel in the scan line. The end-of-scan pulse and the last pixel pulse are compared, and an output is provided for phase error correction, the phase error being equal to the timing difference between the end-of-scan pulse and the last pixel pulse. The phase error is converted to a voltage, which is then added to a center frequency voltage to generate a composite feedback voltage for controlling the voltage controlled oscillator.

U.S. Pat. No. 5,477,330 entitled, "SYNCHRONIZATION TO A START-OF-SCAN DETECTION, AND DIGITAL, GENERATION OF VARIABLE FREQUENCIES, FROM A FIXED-FREQUENCY SOURCE IN AN IMAGE GENERATOR IN ORDER TO HIGHLY ACCURATELY TIME THE PLACEMENT OF PIXELS UPON A SCAN LINE" discloses a fixed-phase, fixed-frequency oscillator as a primary standard for synchronized and variable pixel placement on a scan line. A fixed-frequency timing chain is synchronized to a scanning beam by selecting one of a number of replications of a fixed-phase timing chain that is produced from the oscillator. The synchronized fixed-frequency timing chain is then converted to the required variable-frequency pixel placement timing chain by a timing-data-driven recombination of variably-phase-delayed replications of the source timing chain and a 180° phase-shifted version of the source timing chain.

U.S. Pat. No. 5,517,230 entitled, "Control System for a Variable-Resolution Raster Output Scanner," discloses a control system for a variable resolution raster output scanner. The system controls the video pixel clock associated with a laser light source and the angular velocity of a polygon so that the raster output scanner produces an image at a desired resolution. The output of a first "high resolution position measurement system" provides an instantaneous frequency of the divided down pixel clock. The output of a second "high resolution position measurement system" provides a real-time instantaneous frequency of the scan behavior of the polygon.

A state machine is a hardware representation of a flow chart in which the transition from one state to the succeeding state is defined and depends on the condition of either external or internal control factors valid at the time of each clocked transition. It can be shown that a state machine is the most efficient arrangement of hardware logic gates that can be assembled for a specific task. Like a software program, a state machine can incorporate an arbitrary array of conditional branches, nested loops, unconditional go-tos, wait-states, and similar functions in its design to functionally implement any desired flow chart. Unlike software programming, once installed the design is static, but a state machine is far faster since each branch decision is executed in just one clock cycle instead of the tens or even hundreds of clock cycles typically associated with a software equivalent.

SUMMARY OF THE PRESENT INVENTION

The principles of the present invention provide for high quality scan lines of evenly spaced, uniformly sized pixels in imaging machines that use a raster output scanner. According to the principles of the present invention the raster output laser device is modulated in accordance with a variable frequency pixel clock that is derived from a high frequency source using a dual modulus programmable divider that is controlled by a state machine. Beneficially, that state machine is controlled by information in a memory. Even more beneficially, the variable frequency pixel clock provides a means for proportionately adjusting the overall scan line length (line magnification) in increments of a small fraction of one pixel, and can be applied dynamically to compensates for polygon facet-to-facet errors (scan line jitter).

BRIEF DESCRIPTION OF THE DRAWINGS

For a general understanding of the features of the present invention, reference is made to the drawings, wherein like reference numerals have been used throughout to designate identical elements, in which.

DETAILED DESCRIPTION OF THE PRESENT INVENTION

Figure 3:
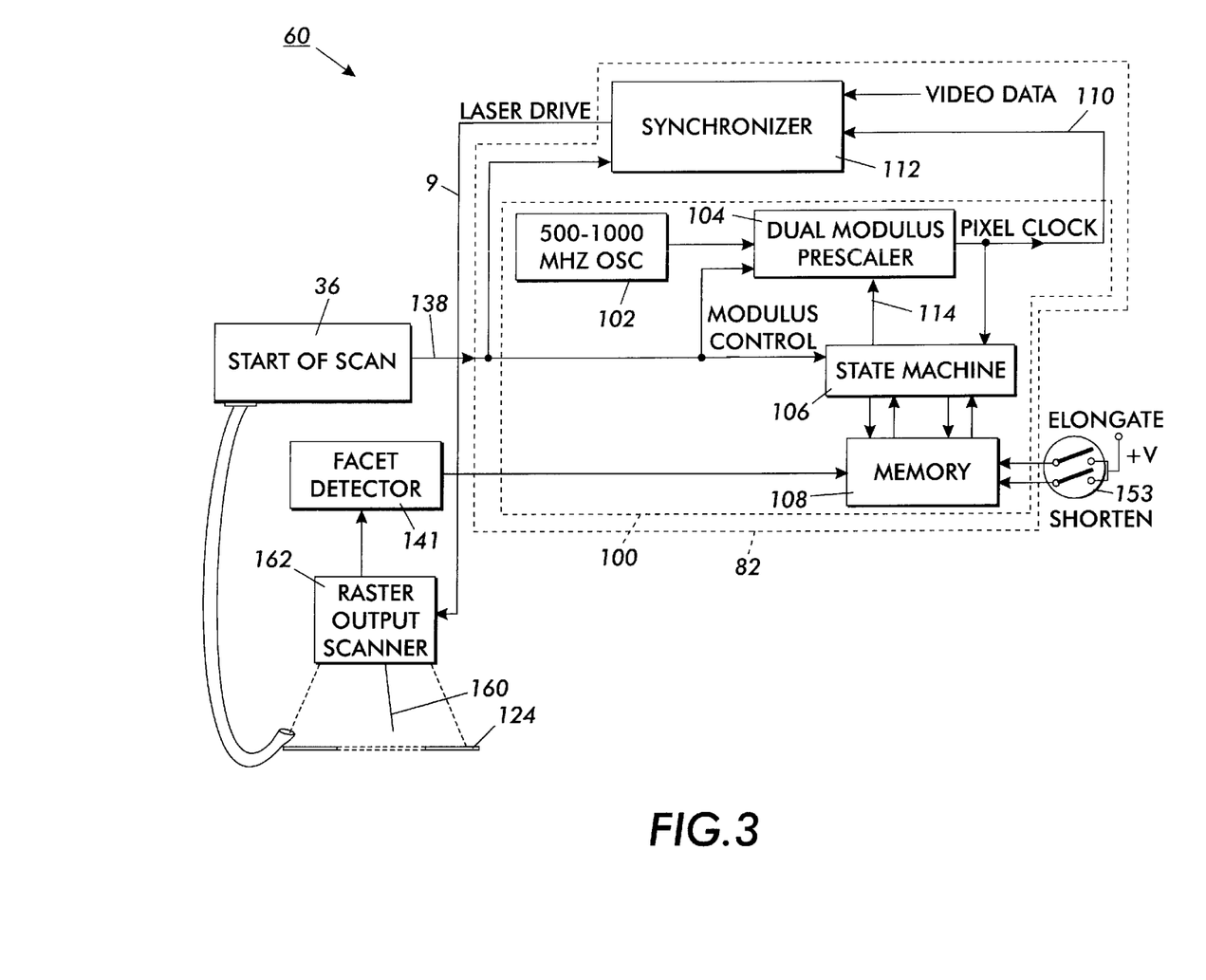
FIG. 3 is a schematic view of an imaging system that incorporates a variable frequency pixel clock that is in accord with the principles of the present invention.

As discussed above, FIG. 2 illustrates a prior art imaging system 30 that produces high quality scan lines of evenly spaced, uniformly sized pixels by employment of a variable frequency pixel clock. That variable frequency pixel clock is derived from a phase locked loop oscillator. FIG. 3 illustrates a new imaging system 60 that, while similar in application to the imaging system 30, uses a variable frequency pixel clock that is derived from a high frequency source using a dual modulus programmable divider that is controlled by a state machine. Additionally, that state machine is itself controlled by information stored in a memory. Furthermore, in the illustrated embodiment the variable frequency pixel clock is arranged to correct for polygon facet errors.

The imaging system 60 achieves a variable frequency pixel clock using a dual modulus prescaler. Frequency synthesis using dual modulus prescalers is known in the prior art, reference Motorola's application note AN827/D (originally printed 5/81). The imaging system 60 includes a controller 82 that has a pixel clock generator 100 comprised of a high frequency oscillator 102, a dual modulus prescaler 104, a state machine 106 and a memory 108.

The pixel clock 100 sends clock signals via a line 110 to a synchronizer 112 within the controller 82. The synchronizer also receives video data that represents the latent image to be produced in a particular scan line. Finally, the synchronizer also receives the start of scan signal on a line 138. The synchronizer produces laser drive signals that modulate a laser beam 160 from a raster output scanner 162 so as to produce a scan line comprised of a plurality of pixels, each having a prescribed position, on a photoreceptor 124. The synchronizer does this by using the start of scan signal to determine when the first pixel of a scan line is to be written. The synchronizer then uses the pixel clock transitions to "gate" the video data. If the clock signals occur at the proper times the pixels produced by the gated video data are properly spaced.

The scheme used by the variable frequency pixel clock to produce properly timed clock signals is to divide the scan line pixels into a sequence of segmented sub-groups referred to hereinafter as S-groups. For example, a scan line 12 inches long having 600 pixels (or individually addressed exposure spots) per inch would have 7200 pixels. If that scan line were divided into S-groups, each 64 pixels long, there would be 113 S-groups. In one embodiment of the present invention, the variable frequency pixel clock provides a sequence of fixed frequencies selected to yield the best piecewise approximation of the desired pixel clock frequency profile. In other words, instead of using a constant frequency for the entire scan line, a separate frequency is generated for each group of 64 sequential pixels in such a way that the accumulated pixel clock phase error in the sequence of successive groups is minimized. In the limiting, any residual pixel misplacement would be exceedingly small because the synthesized pixel clock transitions would be arranged to be made on the cycle of the high-speed oscillator closest to the ideal time. As a consequence, absolute error in the pixel clock transitions would be limited to less than half the period of the high-speed oscillator. For a 500 MHz pixel clock transitions would therefore take place within 1 nanosecond of their ideal points, which is about $1/40^{th}$ of a pixel, assuming a division modulus of 20. A scan line is written as a sequence:

$$SLFP = F_1 + F_2 + \ldots F_{111} + F_{112} + F_{113}$$

Where SLIP is the scan line frequency profile, $F_x$ is the particular scan line frequency for 64 successive pixels, and where the various frequencies are not necessarily unique.

It will be noted that the sequence will contain cumulative errors within the S-groups due to approximating the continuously changing ideal frequency profile with a series of discrete frequencies selected from a limited menu. However, the magnitude of the error introduced by this linear approximation is small, in the case of a scan angle of 24 degrees and sub-groups of 64 pixels, being on the order of no more than one or two periods of the high speed oscillator, or about $1/10$ pixel. It should be clear that this error is only slightly larger than the existing phase error associated with the pixel clock transitions within the S-group.

It is understood that the linear approximation can be improved by reducing the number of pixels in an S-group and representing the frequency profile by a proportionately longer sequence of S-groups. Those familiar with the electronic art will recognize that although this implies that the menu of frequencies has been reduced, it simply represents a revised arrangement of the sequence in which the different frequencies are generated and modulus data is organized and stored in memory. As an example, an S-group might contain 32 pixels instead of 64, with the scan line represented by a sequence of 225 S-groups (twice 112.5) instead of 113. Since the optimum frequency can be selected individually for each group of 32 pixels, this is equivalent to minimizing the phase error at the center of an S-group containing 64 pixels as well as at its ends.

Obtaining a particular clock frequency in a given S-group is achieved using the dual modulus prescaler 104 and the state machine 106. When a SOS signal occurs on line 138 the state machine 106 and the dual modulus prescaler 104 are initialized. The state machine begins sending a string of sequential modulus commands to the dual modulus prescaler such that a predetermined division pattern is applied for each group of 64 pixels in turn.

The state machine commands are selected to control the dual modulus prescaler 104 so that a desired frequency sweep profile is achieved. Dual modulus prescalers have two division factors, $M_1$ and $M_2$, wherein the particular factor used at a given time is determined by the modulus control input 114. As an example, assume that the dual modulus prescaler has a division modulus of either ÷20 or ÷21. Also assume that the ÷20 factor is selected when the state machine applies a 0 (FALSE) to the dual modulus control input 114, and that the prescaler divides the output of oscillator 102 by a factor of 21 when a 1 (TRUE) is applied to input 114. Then, when the state machine applies 0 continuously to control input 114, the output frequency of the dual modulus prescaler 104 is as high as possible, whereas the output frequency is as low as possible when 1 is applied continuously to control input 114.

But, interactions between the state machine 106 and the dual modulus prescaler 104 are capable of producing intermediate average frequencies between the highest and lowest. Assume 64 different frequencies are to be produced. With a dual modulus prescaler having division moduli $M_1$ and $M_2$, the average modulus of a given S-group sequence from the state machine is given by:

$$M_{av} = \frac{[N \times M_2 + (64-N) \times M_1]}{64}$$

$$= \frac{[N \times (M_1 + 1) + (64-N) \times M_1]}{64}$$

if:

$$M_2 = M_1 + 1$$

or:

$$M_1 + N/64$$

when:

$$0 \leq N \leq 64$$

In other words, the average modulus can be adjusted in 64 equal increments between $M_1$ and $M_2$.

There are a very large number of possible patterns from the state machine 106 that can produce a desired average modulus. However, the first 32 patterns $S_x$ of a beneficial scheme (the first bit in any sequence is a 1) are:

From
$S_{21}$=10001001 00100100 10010010 01001001 00100100 10010010 01001001 00100100 invert the order:
$S'_{43}$=00100100 10010010 01001001 00100100 10010010 01001001 00100100 10010001 and complement:
$S_{43}$=1101011 01101101 10110110 11011011 01101101 10110110 110111011 01101110

This arrangement provides a menu of division sequences where the distribution of zeros and ones is uniform and where a 1 leads the sequence. This allows sequences to be assembled in any order with the least accumulation of positional phase error.

With the patterns selected the desired scan line frequency profile:

$$SLFP = F_1 + F_2 + \ldots F_{111} + F_{112} + F_{113}$$

Can be produced by selecting a pattern profile PF:

$$PF = S_{12}S_{13}S_{13}S_{12}S_{13} \ldots S_{33}S_{34}S_{35} \ldots S_{48}S_{49}S_{48} \ldots S_{35}S_{34}S_{34}$$
$$S_{13}S_{12}S_{12}S_{13}S_{12}$$

Wherein the patterns are chosen to produce the desired frequency in each S-group.

A ROS application requiring 600 scan lines per inch (42.3 microns) and a process speed of 3.7 inches per second has a spot velocity on the photoreceptor of roughly 1 nanosecond per micron (depending on the scan line duty cycle). Using an oscillator frequency of 500 MHz as shown in FIG. 3 implies the use of a dual modulus prescaler such as a

TABLE 1

|      | 1        | 2        | 3        | 4        | 5        | 6        | 7        | 8        |
|------|----------|----------|----------|----------|----------|----------|----------|----------|
| S 0  | 00000000 | 00000000 | 00000000 | 00000000 | 00000000 | 00000000 | 00000000 | 00000000 |
| S 1  | 10000000 | 00000000 | 00000000 | 00000000 | 00000000 | 00000000 | 00000000 | 00000000 |
| S 2  | 10000000 | 00000000 | 00000000 | 00000000 | 10000000 | 00000000 | 00000000 | 00000000 |
| S 3  | 10000000 | 00000000 | 00000010 | 00000000 | 00000000 | 00010000 | 00000000 | 00000000 |
| S 4  | 10000000 | 00000000 | 10000000 | 00000000 | 10000000 | 00000000 | 10000000 | 00000000 |
| S 5  | 10000000 | 00001000 | 00000000 | 01000000 | 00000010 | 00000000 | 00010000 | 00000000 |
| S 6  | 10000000 | 00100000 | 00000100 | 00000000 | 10000000 | 00100000 | 00000100 | 00000000 |
| S 7  | 10000000 | 00100000 | 00010000 | 00001000 | 00000100 | 00000010 | 00000001 | 00000000 |
| S 8  | 10000000 | 10000000 | 10000000 | 10000000 | 10000000 | 10000000 | 10000000 | 10000000 |
| S 9  | 10000000 | 10000001 | 00000010 | 00000100 | 00001000 | 00100000 | 00100000 | 01000000 |
| S 10 | 10000000 | 00001000 | 00010000 | 01000000 | 10000010 | 00001000 | 00010000 | 00100000 |
| S 11 | 10000100 | 00010000 | 01000001 | 00000100 | 00000010 | 00001000 | 00001000 | 00100000 |
| S 12 | 10000100 | 00100000 | 10000100 | 00100000 | 10000100 | 00100000 | 10000100 | 00100000 |
| S 13 | 10001000 | 01000010 | 00010000 | 10000100 | 00100001 | 00001000 | 01000010 | 00010000 |
| S 14 | 10000100 | 00100010 | 00010001 | 00001000 | 10000010 | 01000010 | 00100001 | 00010000 |
| S 15 | 10000100 | 01000100 | 00100010 | 00100010 | 00010001 | 00010001 | 00001001 | 10001000 |
| S 16 | 10001000 | 10001000 | 10001000 | 10001000 | 10001000 | 10001000 | 10001000 | 10001000 |
| S 17 | 10001000 | 10001000 | 10010001 | 00010001 | 00100010 | 00100010 | 01000100 | 01000100 |
| S 18 | 10001000 | 10010001 | 00010010 | 01000100 | 10001001 | 00010010 | 00100100 | 01000100 |
| S 19 | 10001001 | 00010010 | 01000100 | 10010001 | 00100100 | 01001001 | 00010010 | 01000100 |
| S 20 | 10001001 | 00100100 | 10001001 | 00100100 | 10001001 | 00100100 | 10001001 | 00100100 |
| S 21 | 10001001 | 00100100 | 10010010 | 01001001 | 00100100 | 10010010 | 01001001 | 00100100 |
| S 22 | 10100100 | 10010010 | 01001001 | 00100100 | 10100100 | 10010010 | 01001001 | 00100100 |
| S 23 | 10100100 | 10010010 | 10010010 | 01010010 | 01001001 | 01001001 | 00101001 | 00100100 |
| S 24 | 10010010 | 10010010 | 10010010 | 10010010 | 10010010 | 10010010 | 10010010 | 10010010 |
| S 25 | 10010010 | 10010100 | 10100101 | 00101001 | 00100101 | 00101001 | 01001010 | 01010010 |
| S 26 | 10101001 | 01001010 | 01010100 | 10010100 | 10101001 | 01001010 | 01010100 | 10010100 |
| S 27 | 10100101 | 00101010 | 01010100 | 10101001 | 01001010 | 01010100 | 10101001 | 01010010 |
| S 28 | 10010100 | 10101010 | 01010101 | 00101010 | 10010101 | 01001010 | 10100101 | 01010010 |
| S 29 | 10010101 | 01001010 | 10101001 | 01010101 | 00101010 | 10100101 | 01010100 | 10101010 |
| S 30 | 10010101 | 01010101 | 00101010 | 10101010 | 10010101 | 01010101 | 00101010 | 10101010 |
| S 31 | 10010101 | 01010101 | 01010101 | 01010101 | 00101010 | 10101010 | 10101010 | 10101010 |
| S 32 | 10101010 | 10101010 | 10101010 | 10101010 | 10101010 | 10101010 | 10101010 | 10101010 |

The patterns for sequences $S_{34}$ through $S_{63}$ can be generated by reversing the order of the bits and then complementing the pattern by changing all the 0's to 1's and all the 1's to 0's. For example, $S_{43}$ is found from $S_{21}$ ($S'_{(64-43)}$) as follows:

$\div 20/\approx 21$. However, using this ratio, the resulting output pixel clock frequency would be limited to a range of only about 5% (1 out of 20).

ROS scanners employ spinning polygons typically have between 8 and 24 optical facets (usually an even integer)

designed for deflection angles between 30 and 10 degrees respectively. A good rule of thumb is given by:

$$\text{ROS half-scan angle} \approx 360/N_f X^{2/3} = 240/Nf$$

where $N_f$ is the number of facets and the factor $^2/_3$ is a typical ROS scanner duty-cycle. Assuming an uncorrected scan displacement profile given by X=F·Tan(theta), a 24-facet polygon with a maximum hall-scan angle of 10 degrees would have only about a 3% differential in spot speed over the length of the scan, whereas a 10 facet polygon exhibits about 17% variation in spot velocity over the scan path.

This means that a frequency synthesizer using a ÷20/÷21 prescaler to generate the pixel clock directly cannot develop the dynamic output range required for polygons with less than about 20 facets. However, a sequence of two successive cycles using a ÷10/÷11 prescaler would have double the range, or about 10% (i.e., 20, 21, or 22 oscillator transitions per pixel), at approximately the same output clock rate. In like manner, a sequence of three cycles using a ÷5/÷6 prescaler would yield a range of about 20% (i.e., 15,16,17, and 18 oscillator transitions per pixel. Employing 4 cycles instead would yield the same percentage output range but at a higher division factor (i.e., 20, 21, 22, 23, and 24 oscillator transitions per pixel). Employment of smaller division factors leads to enhanced dynamic range, but it should be clear that it is functionally equivalent to smaller pixels.

Figure 4:
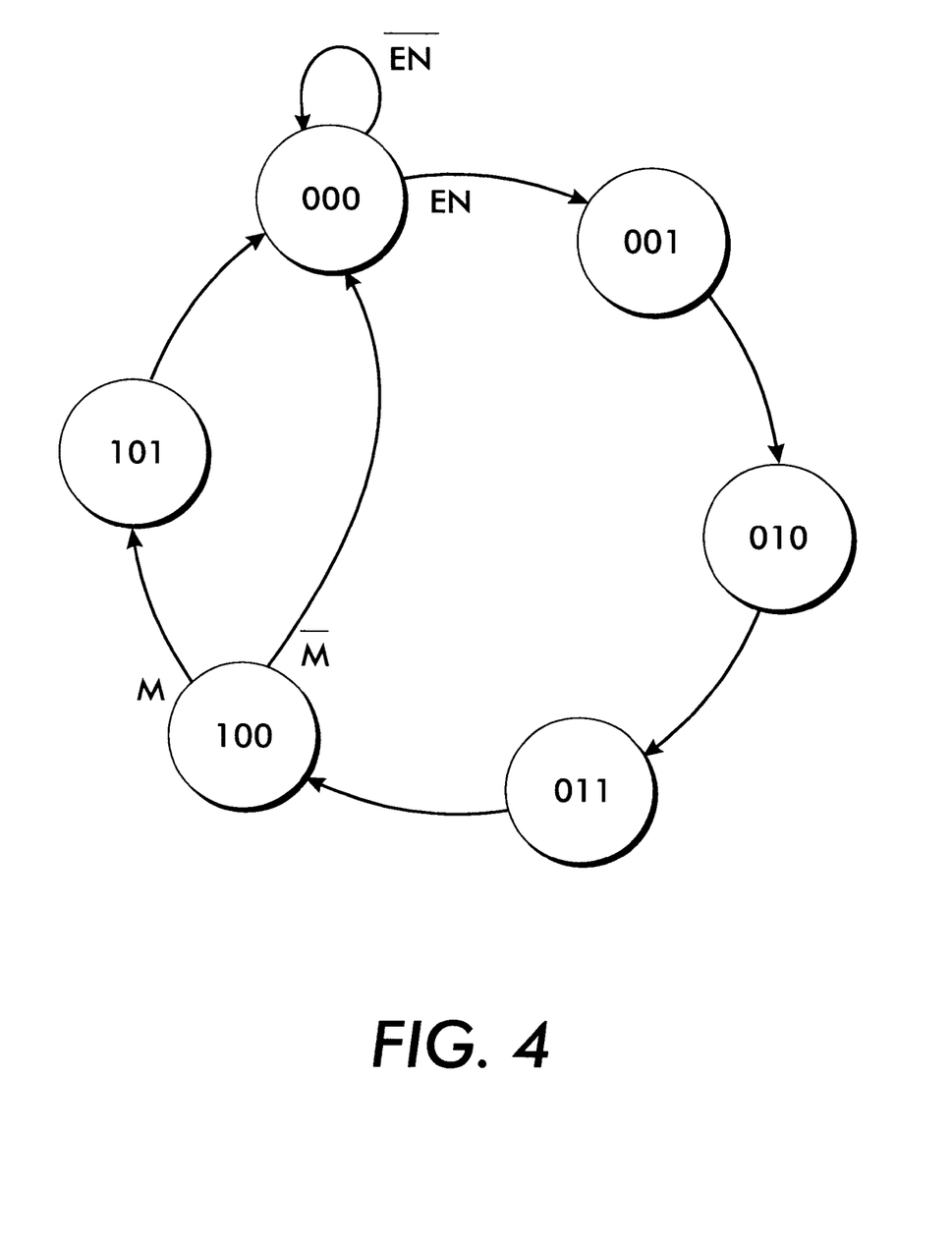
FIG. 4 is a state diagram of a dual modulus prescaler.

FIG. 4 is the state diagram of a dual modulus prescaler with division factors of ÷5 and ÷6. When enabled and clocked, the states (labeled by three digits) progress in the order 000; 001; 010; 011; and 100 as shown by the arrows in the diagram. In state 100, the path has a branch so that the next transition depends on the condition of external control element M. If M is 1 (true), the progression is via 101 to 000. If M is 0 (false), state 101 is bypassed and the next transition goes directly to state 000. The cycle repeats indefinitely, each time taking the path according to the control element M. It should be apparent that the dual modulus prescaler is therefore a simple state machine having six states and one branch controlled by M which is the modulus control input. (In the diagram, a second control input EN has been added for initialization.)

Figure 5:
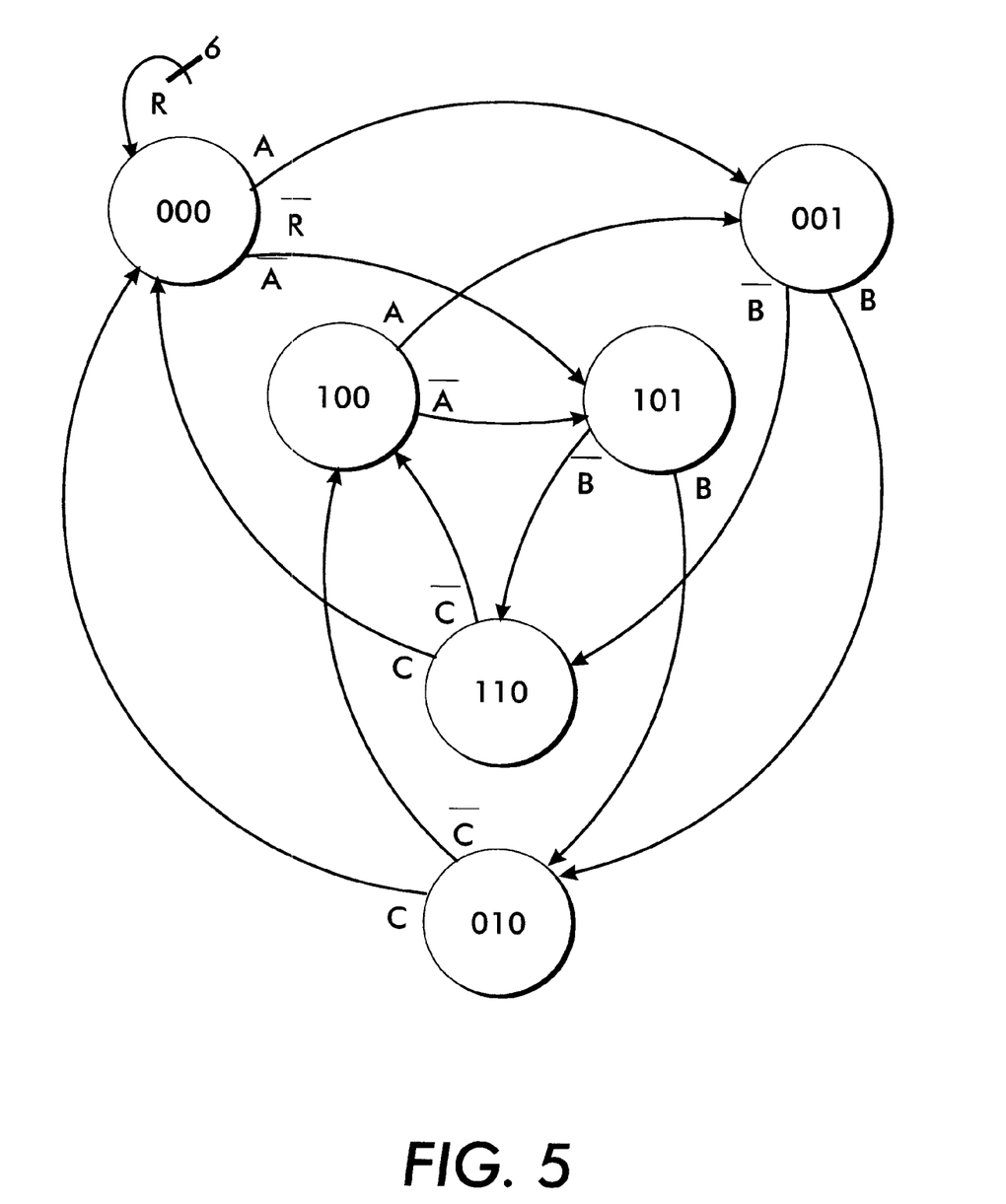
FIG. 5 is a simplified state diagram for forming each pixel clock cycle from a sequence of three successive division moduli using parallel input data.

FIG. 5 is a diagram of a state machine intended to generate one pixel clock from a sequence of three division cycles using a prescaler like that shown in FIG. 4. Each state has a branch so that when clocked, the next state depends on one of three external control elements denoted A, B, and C. From state 000, the path will be to 001 if A is 1 (true) and to 101 if A is 0 (false); from 001 the path will be to 010 if B is 1 (true) and to 110 if B is 0 (false). From 010 the path will be to 000 if C is 1 (true) and to 100 if C is 0 (false). States 100, 101, and 110, shown near the center of FIG. 5, have similar branches controlled by the condition of A, B, and C respectively.

Although the states can be labeled arbitrarily, it is convenient to assign digits that coincide with functional outputs when possible. Thus in FIG. 5, the right-hand bit of the state label (least significant position) has been chosen to coincide with the desired pixel clock output, and the left-hand hit (most significant position) chosen to be 1 (true) for the three inner states and 0 (false) for the outer three states coincides with the desired modulus control output. Thus the state machine of FIG. 5 presents three modulus control outputs in series corresponding to the parallel inputs A, B, and C respectively, and generates a pixel clock output once per loop with a duty cycle of $^1/_3$. The combination of FIG. 4 and FIG. 5 in concert can be viewed functionally as a 4-modulus "prescaler".

Those familiar with the electronics art will understand that the function developed by combining FIGS. 4 and 5 could also be provided by a simple loop of 18 states with from one to three branches. However dual-modulus prescalers developed for very high-speed phase-locked-loops in radio frequency synthesis applications (gigaHertz clock rates) are commercially available, and FIG. 5 can be implemented from a few 200 MHz components. An equivalent custom loop would require that all its components be capable of gigaHertz rates. It is anticipated that in the state machine architecture of FIG. 3, support functions like interactions with the memory can be performed at much lower speeds, especially if the data is organized as parallel words, and can be implemented most efficiently using commercially available programmable logic arrays.

It will be understood that in the present invention the division sequence represented by ABC in FIG. 5 is partially redundant in that there are only four meaningful division factors, i.e., 15, 16, 17 and 18 (for example, inputs ABC= 110, ABC=101, and ABC=011 yield the same output). It is also clear that replacing FIG. 5 with a fixed divide-by-3 counter provides a dual modulus function with a 20% dynamic output frequency range. However, encoding four inputs such as ABC=000, 001, 011, and 111 uses only 2 bits of memory, yet provides the engineering option of more flexibility and finer resolution in minimizing phase error accumulation.

Those practicing the digital electronics art will also appreciate that the memory of FIG. 3 can be partitioned in a number of ways for compactness and ease of design. In a typical application such as described earlier, the S-groups given above consist of series of 64 bits defining different division patterns. There are therefore 64×64=4096 bits describing the S-groups, 113 patterns describing substitutions of S-groups to expand the scan by 1,2,3,4, . . . 112, 113 evenly spaced oscillator periods, and several bits to extend the range of substitutions beyond 113, (i.e., 113 to 226, 226 to 339, . . . ).

The principles of the present invention can be applied to correct for a printing artifact known as ROS polygon facet jitter. While ideally each facet of a polygon is identical, in practice this is not the case because of machining variations. In particular there are small variations in facet geometry so that the effective scan line length varies slightly depending on the facet in use. The resulting scan line jitter signature can be corrected by using slightly different pattern profiles for each facet. To that end, the imaging system 60 includes a facet detector 141 that indicates the facet in use. In its simplest form this can be a once-around tell-tale mark and a photodiode detector or a Hall device that may already be part of the polygon motor drive system. The state machine is arranged to dynamically revise the frequency profile to compensate for the jitter of each facet in turn. It should be understood that the correction for each facet would be determined in a scanner calibration step during manufacture.

In a typical ROS application, it is convenient to have a magnification adjustment range of 1 to 2 mm, (roughly 40 pixels @600 SPI), and a dynamic jitter range of one or two pixels. This translates to a substitution range of 40×20/ 113=7 S-groups (for example substitution of P19 for P12, or P20 for P13) so that only 3 or 4 additional bits is sufficient to cover the full substitution range. In FIG. 3, control input for scan line magnification is shown schematically by manual switches 153. It could also be automatic with appropriate external circuitry (not shown).

Where dynamic intensity control is desired, it can be conveniently encoded in parallel with the S-group data so that the laser drive current is defined by $I_{out}=I_0+I_a (N/N_0)$ where N varies from 0 to $N_0-1$, and $I_a$ is the desired operating current range. For the case where $I_a$ is 20% of $I_0$, encoding the operating current with 4 bits would yield $N_0=16$ or a drive current resolution of about 1.2%. Alternatively, laser drive current may simply be made proportional to the effective frequency by dynamically switching the current operating level in concert with the division modulus. Thus for a ÷20/÷21 prescaler division ratio, two operating current levels would be employed with a ratio of 21:20. This could be accomplished using a simple resistive network (with optional RC filtering) to generate two input current levels for a laser drive circuit such as described in U.S. Pat. No. 5,651,017, by Genovese and entitled "Drive Circuit for High Speed Modulation of a Laser Diode."

Those experienced in digital design will understand that the needed profile data can be stored in stand-alone preprogrammed non-volatile memory such as EPROM. Alternatively, in some applications it would be more convenient to employ volatile RAM that is downloaded from an external software source once per session. Finally, if a printing software host already exists, it may be most efficient to download both the image data and the scan line frequency profiles as parallel data paths for each scan.

While this invention has been described in conjunction with a specific embodiment, it is evident that many alternatives, modifications and variations will be apparent to those skilled in the art. Accordingly, the present invention is intended to embrace all alternatives, modifications, and variations that fall within the spirit and scope of the claims.

What is claimed is:

1. A laser scanner including a rotating multifaceted polygon for scanning a laser beam across an imaging member to form a plurality of scan lines, with the laser beam being modulated in response to video data, the laser scanner having a combination of:
   a start of scan detector for producing start of scan (SOS) signals;
   an oscillator producing a main frequency;
   a dual modulus programmable divider for dividing said main frequency by a variable division ratio to produce a pixel clock frequency, wherein said variable division ratio depends upon a modulus M1 and upon a modulus M2;
   a state machine for applying said modulus M1 and said modulus M2 to said dual modulus programmable divider according to an input scan line frequency pattern;
   a memory for storing a plurality of scan line frequency patterns, said memory further for inputting a selected scan line frequency pattern to said state machine following a start of scan signal; and
   a synchronizer for synchronizing said video data with said pixel clock frequency;
   wherein said modulated laser beam produces a plurality of substantially evenly spaced pixels in a scan line.

2. A laser scanner according to claim 1, wherein said memory comprises a programmable memory.

3. A laser scanner according to claim 1, further including a switch for selectively applying an input to said memory, wherein said memory uses said switch input to select said scan line frequency pattern to input to said state machine.

4. A laser scanner according to claim 1, wherein main frequency is derived from a crystal.

5. A laser marking machine, comprising:
   a photoreceptor;
   a raster scanner sweeping a modulated laser beam across said photoreceptor;
   a video data source for producing a video data;
   a start of scan detector for producing start of scan (SOS) signals;
   an oscillator producing a main frequency;
   a dual modulus programmable divider for dividing said main frequency by a variable division ratio to produce a pixel clock frequency, wherein said variable division ratio depends upon a modulus M1 and upon a modulus M2;
   a state machine for applying said modulus M1 and said modulus M2 to said dual modulus programmable divider according to an input scan line frequency pattern;
   a memory for storing a plurality of scan line frequency patterns, said memory further for inputting a selected scan fine frequency pattern to said state machine following a start of scan signal; and
   a synchronizer for synchronizing said video data with said pixel clock frequency to produce laser drive signals that modulate a laser beam so as to produce said modulated laser beam;
   wherein said modulated laser beam produces a plurality of substantially evenly spaced pixels in a scan line.

6. A laser marking machine according to claim 5, wherein said memory comprises a programmable memory.

7. A laser marking machine according to claim 5, further including a switch for selectively applying an input to said memory, wherein said memory uses said switch input to select said scan line frequency pattern to input to said state machine.

8. A laser marking machine according to claim 5, wherein said main frequency is derived from a crystal.

9. A laser scanner including a rotating multifaceted polygon for scanning a laser beam across an imaging member to form a plurality of scan lines, with the laser beam being modulated in response to video data, the laser scanner having a combination of:
   a start of scan detector for producing start of scan (SOS) signals;
   an oscillator producing a main frequency;
   a dual modulus programmable divider for dividing said main frequency by a variable division ratio to produce a pixel clock frequency, wherein said variable division ratio depends upon a modulus M1 and upon a modulus M2;
   a state machine for applying said modulus M1 and said modulus M2 to said dual modulus programmable divider according to an input scan line frequency pattern;
   a memory for storing a plurality of scan line frequency patterns, said memory further for inputting a selected scan line frequency pattern to said state machine following a start of scan signal;
   a synchronizer for synchronizing said video data with said pixel clock frequency; and
   a facet detector for determining which facet of said multifaceted polygon is to produce a scan line;
   wherein said memory receives said determination from said facet detector, wherein said memory uses said determination to select said scan line frequency pattern to input to said state machine, and wherein said modulated laser beam produces a plurality of substantially evenly spaced pixels in a scan line.

10. A laser scanner according to claim 9, wherein said memory comprises a programmable memory.

11. A laser scanner according to claim 9, further including a switch for selectively applying an input to said memory, wherein said memory uses said switch input to select said scan line frequency pattern to input to said state machine.

12. A laser scanner according to claim 9, wherein said main frequency is derived from a crystal.

13. A laser marking machine, comprising:

a photoreceptor;

a raster scanner having a multifaceted polygon for sweeping a modulated laser beam across said photoreceptor;

a video data source for producing a video data;

a start of scan detector for producing start of scan (SOS) signals;

an oscillator producing a main frequency;

a dual modulus programmable divider for dividing said main frequency by a variable division ratio to produce a pixel clock frequency, wherein said variable division ratio depends upon a modulus M1 and upon a modulus M2;

a state machine for applying said modulus M1 and said modulus M2 to said dual modulus programmable divider according to an input scan line frequency pattern;

a memory for storing a plurality of scan line frequency patterns, said memory further for inputting a selected scan line frequency pattern to said state machine following a start of scan signal;

a synchronizer for synchronizing said video data with said pixel clock frequency to produce laser drive signals that modulate a laser beam so as to produce said modulated laser beam; and a facet detector for determining which facet of said multifaceted polygon is to produce a scan line;

wherein said memory receives said determination from said facet detector, wherein said memory uses said determination to select said scan line frequency pattern to input to said state machine, and wherein said modulated laser beam produces a plurality of substantially evenly spaced pixels in a scan line.

14. A laser marking machine according to claim 13, wherein said memory comprises a programmable memory.

15. A laser marking machine according to claim 13, further including a switch for selectively applying an input to said memory, wherein said memory uses said switch input to select said scan line frequency pattern to input to said state machine.

16. A laser marking machine according to claim 13, wherein said main frequency is derived from a crystal.

* * * * *